US012214374B2

(12) United States Patent
Obori

(10) Patent No.: US 12,214,374 B2
(45) Date of Patent: Feb. 4, 2025

(54) COATING APPARATUS AND COATING METHOD

(71) Applicant: Toray Industries, Inc., Tokyo (JP)

(72) Inventor: Masanao Obori, Otsu (JP)

(73) Assignee: Toray Industries, Inc., Tokyo (JP)

( * ) Notice: Subject to any disclaimer, the term of this patent is extended or adjusted under 35 U.S.C. 154(b) by 64 days.

(21) Appl. No.: 17/919,348

(22) PCT Filed: Apr. 16, 2021

(86) PCT No.: PCT/JP2021/015758
§ 371 (c)(1),
(2) Date: Oct. 17, 2022

(87) PCT Pub. No.: WO2021/215367
PCT Pub. Date: Oct. 28, 2021

(65) Prior Publication Data
US 2023/0149967 A1 May 18, 2023

(30) Foreign Application Priority Data
Apr. 24, 2020 (JP) ................................ 2020-077094

(51) Int. Cl.
*B05C 1/08* (2006.01)
*B05D 1/28* (2006.01)
*B05D 7/04* (2006.01)

(52) U.S. Cl.
CPC .......... *B05C 1/0865* (2013.01); *B05C 1/0813* (2013.01); *B05C 1/0834* (2013.01);
(Continued)

(58) Field of Classification Search
None
See application file for complete search history.

(56) References Cited

U.S. PATENT DOCUMENTS 3,468,287 A * 9/1969 Hill ...................... B65C 9/2265 118/246
8,256,371 B2 * 9/2012 Takatsuka ............ B05C 1/0813 118/200
(Continued)

FOREIGN PATENT DOCUMENTS

CN 2409117 Y 12/2000
CN 101085446 A 12/2007
(Continued)

OTHER PUBLICATIONS

International Search Report and Written Opinion for International Application No. PCT/JP2021/015758, dated Jul. 6, 2021, 5 pages.
(Continued)

*Primary Examiner* — Jethro M. Pence
(74) *Attorney, Agent, or Firm* — Buchanan Ingersoll & Rooney PC

(57) ABSTRACT

A coating apparatus includes: a container configured to accumulate a coating liquid; a rotatable coating bar arranged at an opening part so that the coating bar has a clearance between the coating bar and a downstream side end of an upstream side cover and a clearance between the coating bar and an upstream side end of a downstream side cover and a rotation axis direction of the coating bar is directed in a longitudinal direction of the container; a plurality of rotatable supports intermittently arranged along the rotation axis direction of the coating bar; and an in-liquid cover extending in the longitudinal direction of the container.

12 Claims, 13 Drawing Sheets

(52) U.S. Cl.
CPC ................. *B05D 1/28* (2013.01); *B05D 7/04* (2013.01); *B05D 2252/02* (2013.01)

(56) References Cited

U.S. PATENT DOCUMENTS

| | | | | |
|---|---|---|---|---|
| 9,833,966 | B2* | 12/2017 | Ohira | B05C 1/0813 |
| 2006/0045981 | A1* | 3/2006 | Tsushi | B05C 17/0308 427/428.01 |
| 2009/0255266 | A1 | 10/2009 | Varanasi et al. | |
| 2011/0244136 | A1 | 10/2011 | Ryabova | |
| 2014/0004276 | A1 | 1/2014 | Ryabova | |
| 2015/0321213 | A1 | 11/2015 | Ryabova | |
| 2017/0173622 | A1 | 6/2017 | Nishimori et al. | |
| 2018/0284641 | A1 | 10/2018 | Soeta et al. | |

FOREIGN PATENT DOCUMENTS

| | | | |
|---|---|---|---|
| CN | 101566343 | A | 10/2009 |
| CN | 102971085 | A | 3/2013 |
| CN | 205205229 | U | 5/2016 |
| CN | 207840076 | U | 9/2018 |
| GB | 2 071 012 | A | 9/1981 |
| JP | 0245174 | U | 3/1990 |
| JP | H04-122670 | U | 11/1992 |
| JP | H09-173949 | A | 7/1997 |
| JP | 105650 | A | 1/1998 |
| JP | 2000-015155 | A | 1/2000 |
| JP | 2003275643 | A | 9/2003 |
| JP | 2008238082 | A | 10/2008 |
| JP | 2010-064007 | A | 3/2010 |
| JP | 2010075777 | A | 4/2010 |
| JP | 2011050883 | A | 3/2011 |
| JP | 4894587 | B2 | 3/2012 |
| JP | 5062125 | B2 | 10/2012 |
| JP | 2013-000695 | A | 1/2013 |
| JP | 2013022529 | A | 2/2013 |
| JP | 2014180621 | A | 9/2014 |
| JP | 2018169571 | A | 11/2018 |
| KR | 20-0183969 | Y1 | 6/2000 |
| WO | 2015145817 | A1 | 10/2015 |

OTHER PUBLICATIONS

Chinese Office Action with Search Report for Chinese Application No. 202180029350.9, dated Aug. 10, 2023 with 1 translation, 20 pages.

The extended European Search Report issued Jul. 18, 2024, by the European Patent Office in corresponding European Patent Application No. 21792596.5-1009. (11 pages).

Office Action (The Second Office Action) issued Feb. 23, 2024, by the State Intellectual Property Office of People's Republic of China in corresponding Chinese Patent Application No. 202180029350.9 and an English translation of the Office Action. (19 pages).

* cited by examiner

COATING APPARATUS AND COATING METHOD

CROSS REFERENCE TO RELATED APPLICATIONS

This is the U.S. National Phase application of PCT/JP2021/015758, filed Apr. 16, 2021 which claims priority to Japanese Patent Application No. 2020-077094, filed Apr. 24, 2020, the disclosures of each of these applications being incorporated herein by reference in their entireties for all purposes.

FIELD OF THE INVENTION

The present invention relates to a coating apparatus and a coating method.

BACKGROUND OF THE INVENTION

Conventionally, as a method for uniformly coating the surface of a conveying web such as a thermoplastic resin film or other material with a coating liquid, a rod coating method has been exemplified. This method is a method for pressing a coating bar extending in the width direction of the web to the lower surface of a running web and scraping off (metering) the excess amount of coating liquid previously supplied to the web by the coating bar. The coating bar is rotated by frictional force generated between the coating bar and the web by being pressed to the web or by driving force provided by a motor or the like. The coating bar is generally in the form of a long rod having a diameter of several tens of millimeters and a length of several hundred to several thousand millimeters and thus tends to deflect due to its own weight and reaction force that the coating rod receives from the web. As a method for preventing this deflection, a method for supporting the coating bar from below with a support having a V-shaped cross section extending in the width direction of the coating bar has been known as disclosed in Patent Literature 1. In this method, however, the coating bar may have caused rotation failure due to friction with the support having a V-shaped cross section, resulting in causing streaky defects. In addition, in this method, the rotation of a bar for attaching a coating liquid and a bar for metering may have caused the support having a V-shaped cross section to be abraded and thus foreign matter defects may be caused due to coating of the web with this abraded powder together with the coating liquid.

Therefore, for example, a coating apparatus having a rotatable roller as a support unit has been known, as disclosed in Patent Literature 2. A plurality of support units are intermittently arranged in the longitudinal direction of the coating bar and with respect to each support unit, rollers are rotatably installed in an aspect in which the rollers form a pair on an upstream side and a downstream side in the conveying direction of the web. The frictional resistance between the coating bar and the support unit can be reduced by supporting the coating bar in a circumscribed manner using these pairs of rotatable rollers and thus abrasion and deformation of the support unit can be reduced. In the case of this coating apparatus, however, contacting and rotating the coating bar in a state where a thin layer of the coating liquid remains on surface and the rotatable supports cause air bubbles to be trapped in the contact part between the coating bar and the supports. The web is coated with these air bubbles together with the coating liquid remaining on the surface of the coating bar and thereafter these air bubbles are burst on the web. This may cause coating loss-like defects.

As a technique to prevent this, for example, a coating apparatus in which rotatable supports for supporting the coating bar are arranged in a container and the container is filled with the coating liquid has been known, as disclosed in Patent Literatures 3 and 4. The coating liquid is supplied into the container and the coating is performed while the coating liquid is being leaked through a clearance formed by the tips of the upstream side and downstream side covers configuring the upper part of the container and the surface of the coating bar. The coating bar is arranged in the vicinity of the liquid surface of the coating liquid filled in the container and coating is performed by scraping up the coating liquid in the container by the rotation of the coating bar. In this apparatus, the contact parts between the coating bar and the rotatable supports are submerged in the coating liquid and thus air bubbles are less likely to be trapped.

As described in Patent Literatures 3 and 4, however, accompanying flow generated in the container by the rotation of the supports may cause the liquid surface to ripple and air bubbles to be trapped in this apparatus. The generated air bubbles flow in the container together with the coating liquid, are scraped up by the coating bar, and applied to the web. Consequently, coating loss-like defects may be caused similar to Patent Literature 2.

In response to the above problem, Patent Literatures 3, 4, and 5 have disclosed techniques of reducing the rippling of the liquid surface caused by the accompanying flow. Disclosed in Patent Literature 3 is a technique of installing an elastic blade in the vicinity of the liquid surface. The accompanying flow generated by the rotating supports is dammed by the elastic blade before the accompanying flow reaches the liquid surface and thus fluctuations in the liquid surface can be reduced. Disclosed in Patent Literature 4 is a technique of installing a weir on the upper part of the rotating supports and close to the coating bar The weir dams the accompanying flow, whereby fluctuations in the liquid surface can be reduced. Patent Literature 5 has disclosed a technique of installing a weir close to the outer circumferential surface of the support. This technique allows the accompanying flow of the supports to be reduced and thus the fluctuations in the liquid surface to be reduced.

PATENT LITERATURE

Patent Literature 1: Japanese Patent Application Laid-open No. 2003-275643

Patent Literature 2: Japanese Utility Model Application Laid-open No. H2-45174

Patent Literature 3: Japanese Patent Application Laid-open No. 2010-75777

Patent Literature 4: Japanese Patent Application Laid-open No. 2008-238082

Patent Literature 5: WO 2015/145817 Pamphlet

SUMMARY OF THE INVENTION

In the technique of installing the elastic blade disclosed in Patent Literature 3, however, coating loss-like defects may be caused in the case where air bubbles are mixed in the coating liquid supplied into the container. This will be described using FIGS. 10 and 11. FIG. 11 is a schematic view illustrating a coating bar surface. In a coating bar 1, grooves are formed on the surface of the coating bar, for example, by winding a wire 10 around a rod 9 as illustrated in FIG. 11. FIG. 10 is an enlarged view of an area in the vicinity of a coating bar in Patent Literature 3. The coating bar 1 supported by supports 2 is pressed to a conveying web 8 to drivenly rotate. The supports 2 are drivenly rotated by the coating bar 1 and an accompanying flow 4 is generated. The accompanying flow 4 is dammed by an elastic blade 11 and thus the pulsation of a liquid surface 41 is reduced. The elastic blade 11, however, does not prevent the generation of the accompanying flow itself. Therefore, as illustrated in FIG. 10, air bubbles 6 in the coating liquid reach the vicinity of the surface of the coating bar 1 by the accompanying flow 4 of the supports 2. Thereafter, the air bubbles 6 are involved in an accompanying flow 5 of the coating bar and captured in the groove of the coating bar 1 at a contact point 7. The captured air bubbles 6 are carried to the surface of the web by the rotation of the coating bar 1 and applied to the web surface. As a result, coating loss-like defects may be caused on the web 8. In addition, the case where the air bubbles 6 may also reach the lower surface of the elastic blade 11 by the accompanying flow 4 may also exist. In this case, the air bubbles 6 may be involved in the accompanying flow 5 of the coating bar while the air bubbles 6 stay at the lower surface of the elastic blade and thus coating loss-like defects may be caused on the web as similar to the above case.

In addition, even in the technique of installing the weir disclosed in Patent Literature 4, in the case where the air bubbles are mixed with the coating liquid supplied into the container, coating loss-like defects may also be caused on the web as similar to the technique in Patent Literature 3. This will be described using FIG. 12. FIG. 12 is an enlarged view of an area in the vicinity of a coating bar in Patent Literature 4. The coating bar 1 supported by supports 2 is pressed to a conveying web 8 to drivenly rotate. The pulsation of a liquid surface 41 is reduced because an accompanying flow 4 is dammed by a weir 3. As illustrated in FIG. 12, however, the weir 3 does not prevent the generation of the accompanying flow itself and thus air bubbles 6 in the coating liquid flow between the weir 3 and the supports 2 due to the accompanying flow 4 of the supports 2 and reach in the vicinity of the surface of the coating bar 1. Thereafter, the air bubbles 6 are involved in an accompanying flow 5 of the coating bar and captured in the groove of the coating bar 1 at a contact point 7. Thereafter, coating loss-like defects may be caused on the web from a similar reason to the reason in Patent Literature 3.

In addition, the technique disclosed in Patent Literature 5, in which the weir is installed close to the outer circumferential surface of the support, cannot control the accompanying flow at a higher coating speed and thus coating loss-like defects on the web and splattering defects of coating liquid on the web may be caused. This will be described using FIG. 13. FIG. 13 is an enlarged view of an area in the vicinity of a coating bar in Patent Literature 5. A weir 37 does not cover all of supports 2. A clearance exists between the supports 2 and a downstream side cover 34 and thus the accompanying flow is impossible to be controlled in the case of further high-speed coating, resulting in fluctuating a liquid surface 41. For example, an accompanying flow 40*a* from the lower part of supports 2*b* is dammed by the weir 37, while an accompanying flow 40*b* from the upper part of supports 2*b* flows toward the coating bar 1 and the liquid surface 41. As a result, the coating liquid may be attached directly to a web 8 or coating loss-like defects may be caused by trapping air bubbles 6.

The present invention provides a coating apparatus and a coating method that can prevent air bubbles from being trapped or involved even in high-speed coating and reduce coating defects being caused by the air bubbles.

A first coating apparatus according to embodiments of the present invention to solve the above-described problem includes: a container configured to accumulate a coating liquid, the container including an upstream side cover and a downstream side cover dividedly arranged on an upper part of the container in an upstream side and a downstream side in a running direction of a web to form an opening part extending in a longitudinal direction of the container; a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; and a plurality of rotatable supports intermittently arranged along the rotation axis direction of the coating bar, the supports supporting the coating bar from below in the container. When the downstream side cover is observed from above in a vertical direction, a range of an upstream side end of the downstream side cover overlapped with the supports is determined to be an overlapped range, and a part within a range of the upstream side end of the downstream side cover interposed between adjacent overlapped ranges exists in the upstream side end of the in-liquid cover, the part being a part at which a clearance from a surface of the coating bar is wider than a clearance from the surface of the coating bar at a position within each of the overlapped ranges interposing the part.

A second coating apparatus according to embodiments of the present invention to solve the above-described problem includes: a container configured to accumulate a coating liquid, the container including an upstream side cover and a downstream side cover dividedly arranged on an upper part of the container in an upstream side and a downstream side in a running direction of a web to form an opening part extending in a longitudinal direction of the container; a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; and a plurality of rotatable supports intermittently arranged along the rotation axis direction of the coating bar, the supports supporting the coating bar from below in the container. When the downstream side cover is observed from above in a vertical direction, a region of the downstream side cover overlapped with the supports is determined to be an overlapped region, and openings are formed in a region of the downstream side cover interposed between adjacent overlapped regions.

A third coating apparatus according to embodiments of the present invention to solve the above-described problem includes: a container configured to accumulate a coating liquid, the container including an upstream side cover and a downstream side cover dividedly arranged in an upper part of the container on an upstream side and a downstream side in a running direction of a web to form an opening part extending in a longitudinal direction of the container; a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; a plurality of rotatable supports intermittently arranged along the rotation axis direction of the coating bar, the supports supporting the coating bar from below in the container; and an in-liquid cover extending in the longitudinal direction of the container, the in-liquid cover being arranged between the downstream side cover and the supports. When the in-liquid cover is observed from above in a vertical direction, a range of an upstream side end of the in-liquid cover overlapped with the supports is determined to be an overlapped range, and a part within a range of the upstream side end of the in-liquid cover interposed between adjacent overlapped ranges exists in the upstream side end of the in-liquid cover, the part being a part at which a clearance from a surface of the coating bar is wider than a clearance from the surface of the coating bar at a position within each of the overlapped ranges interposing the part.

A fourth coating apparatus according to embodiments of the present invention to solve the above-described problem includes: a container configured to accumulate a coating liquid, the container including an upstream side cover and a downstream side cover dividedly arranged on an upper part of the container in an upstream side and a downstream side in a running direction of a web to form an opening part extending in a longitudinal direction of the container; a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; a plurality of rotatable supports intermittently arranged along the rotation axis direction of the coating bar, the supports supporting the coating bar from below in the container; an in-liquid cover extending in the longitudinal direction of the container, the in-liquid cover being arranged between the downstream side cover and the supports. When the in-liquid cover is observed from above in a vertical direction, a region of the in-liquid cover overlapped with the supports is determined to be an overlapped region, and openings are formed in a region of the in-liquid cover interposed between adjacent overlapped regions.

A coating method according to embodiments of the present invention to solve the above-described problem includes: using the coating apparatus according to embodiments of the present invention; immersing the coating bar into a coating liquid while supplying the coating liquid into the container; pressing the coating bar to a web conveyed from an upstream side to a downstream side at a predetermined speed; and coating the web with the coating liquid.

The "upstream side" in the present application refers to a side where the coating apparatus is directed in a direction opposite to a conveying direction of the web when the coating apparatus is installed in a conveying line of the web.

The "downstream side" in the present application refers to a side where the coating apparatus is directed in the conveying direction of the web when the coating apparatus is installed in the conveying line of the web.

According to the coating apparatus according to embodiments of the present invention and the coating method using the coating apparatus according to embodiments of the present invention, fluctuation of the liquid surface due to the accompanying flow of the supports in high-speed coating can be prevented. As a result, attaching the coating liquid to the web and trapping the air bubbles in the coating part can be prevented and thus coating defects being caused by the air bubbles can be reduced. In addition, even in the case where the air bubbles are mixed in the coating liquid filled in the coating apparatus, the air bubbles are prevented from being caught on the coating bar and thus coating defects being caused by the air bubbles can be prevented.

DETAILED DESCRIPTION OF EMBODIMENTS OF THE INVENTION

Hereinafter, examples of embodiments of the present invention will be described with reference to the drawings.

[First Coating Apparatus and Coating Method]

Figure 1:
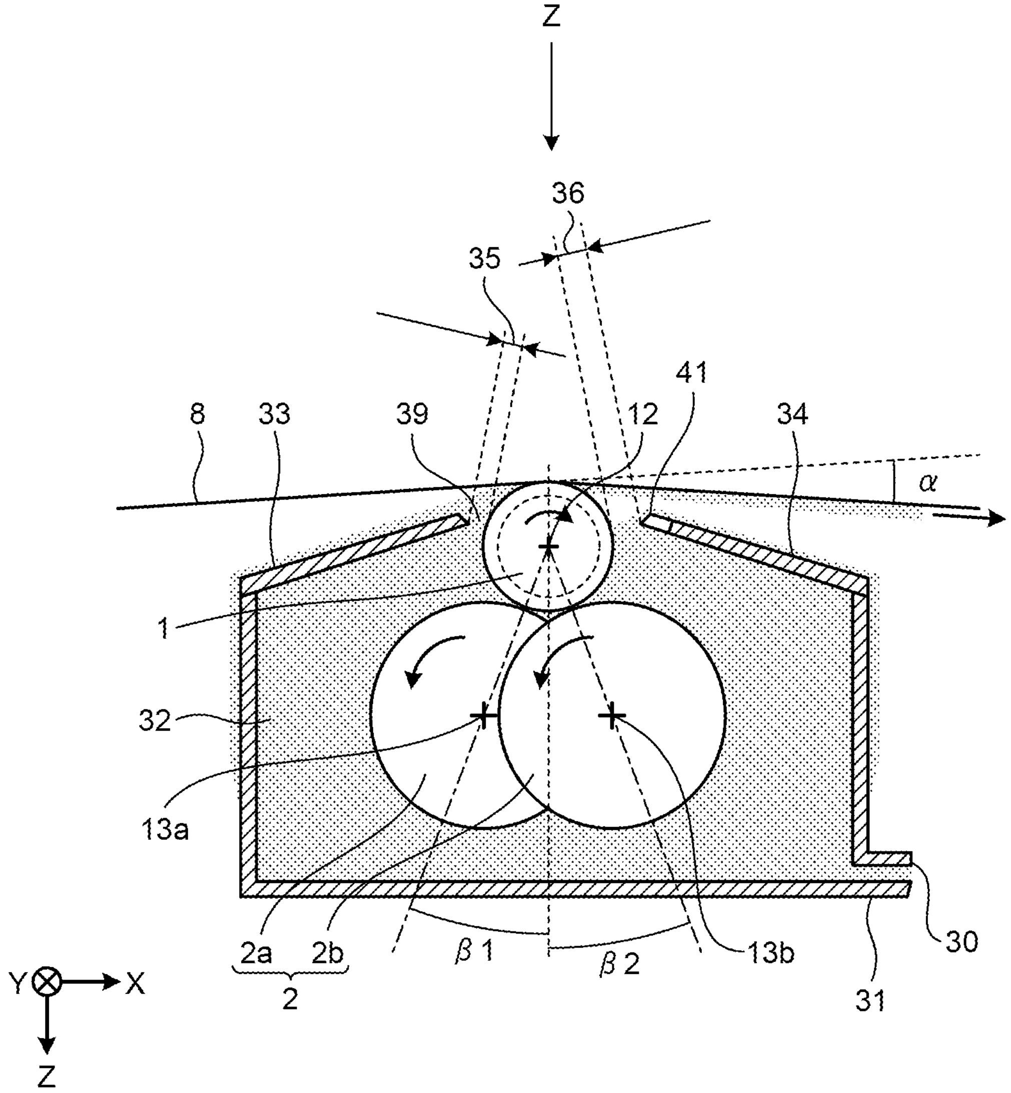
FIG. 1 is a schematic cross-sectional view of a first coating apparatus according to embodiments of the present invention.
Figure 2:
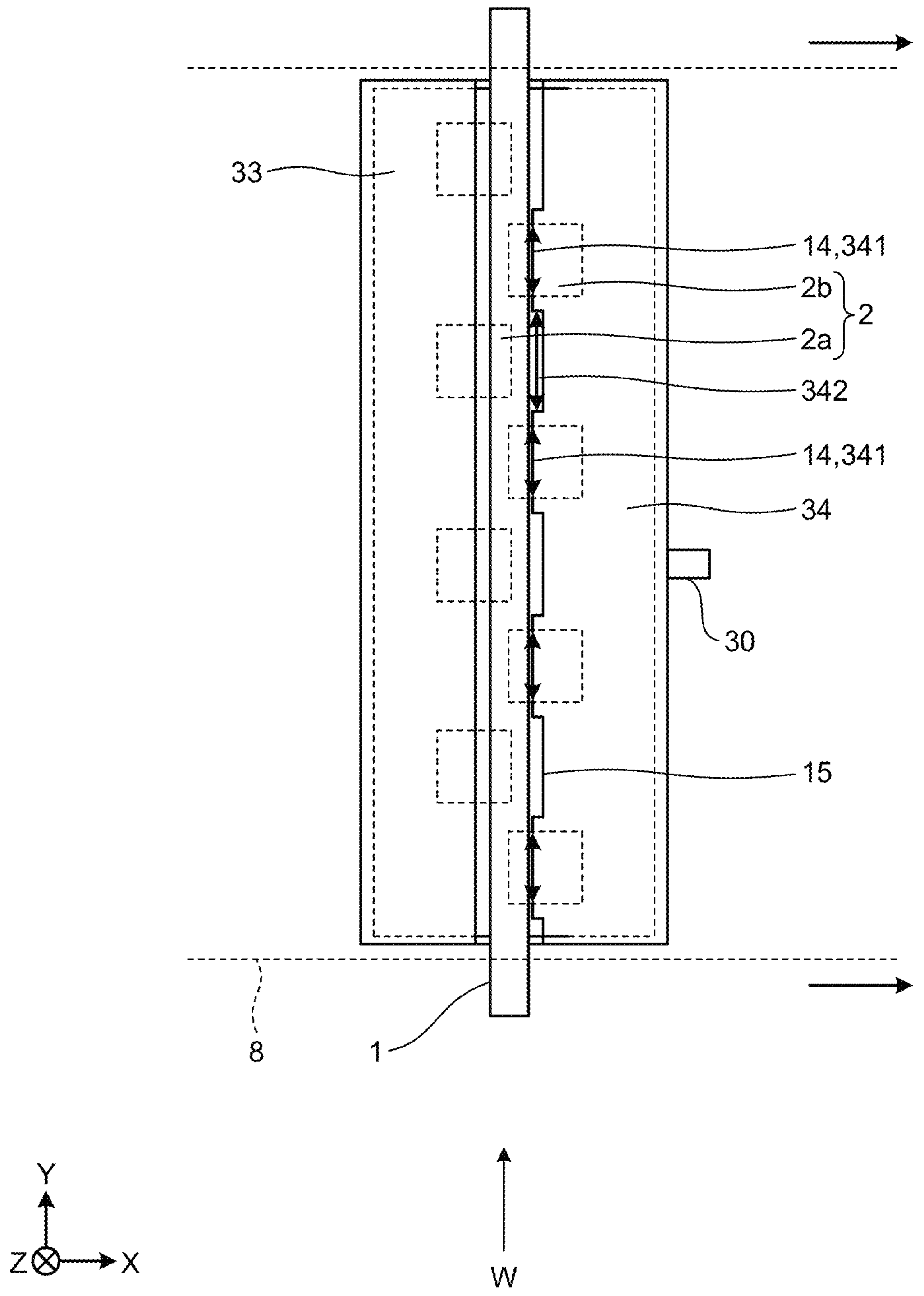
FIG. 2 is a top view of the coating apparatus in FIG. 1 viewed from a Z direction.
Figure 3:
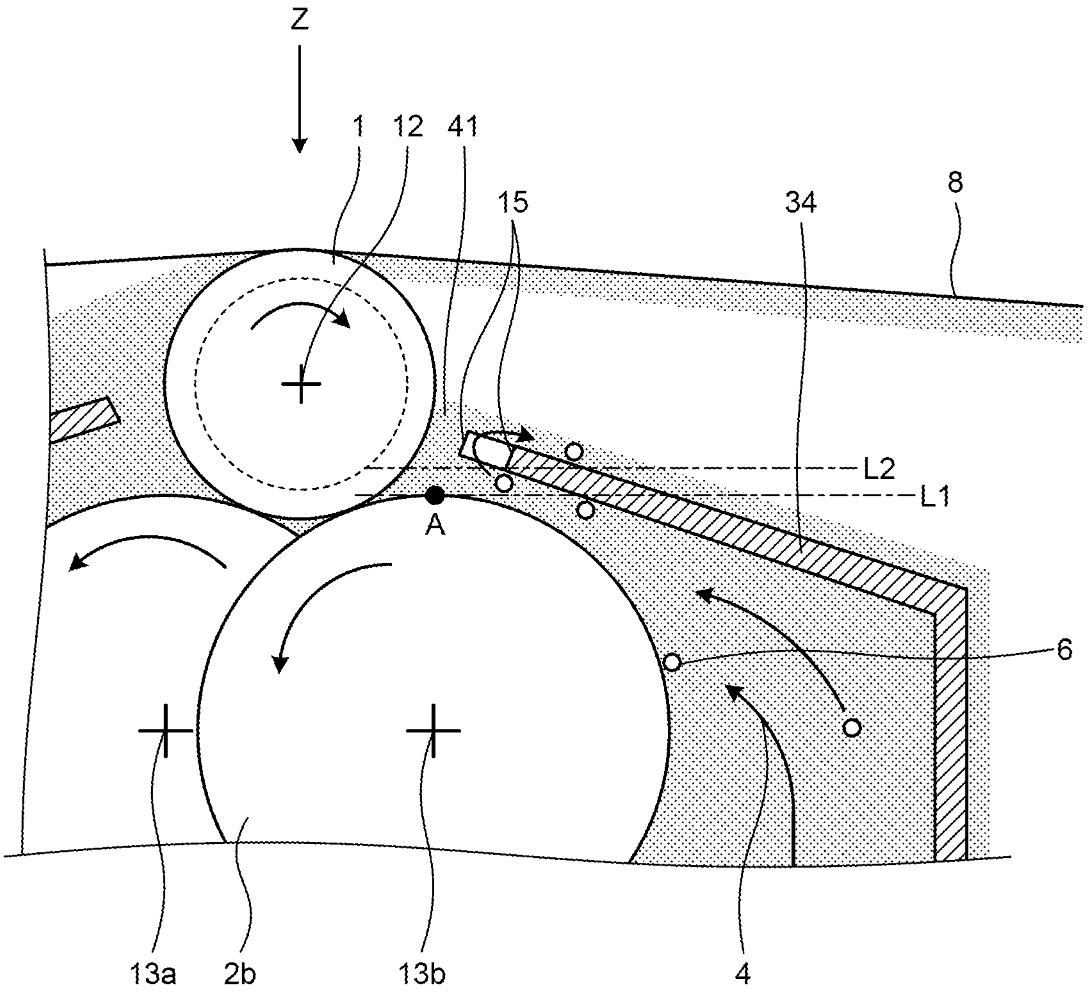
FIG. 3 is an enlarged view of an area in the vicinity of a coating bar in the coating apparatus in FIG. 1.
Figure 4:
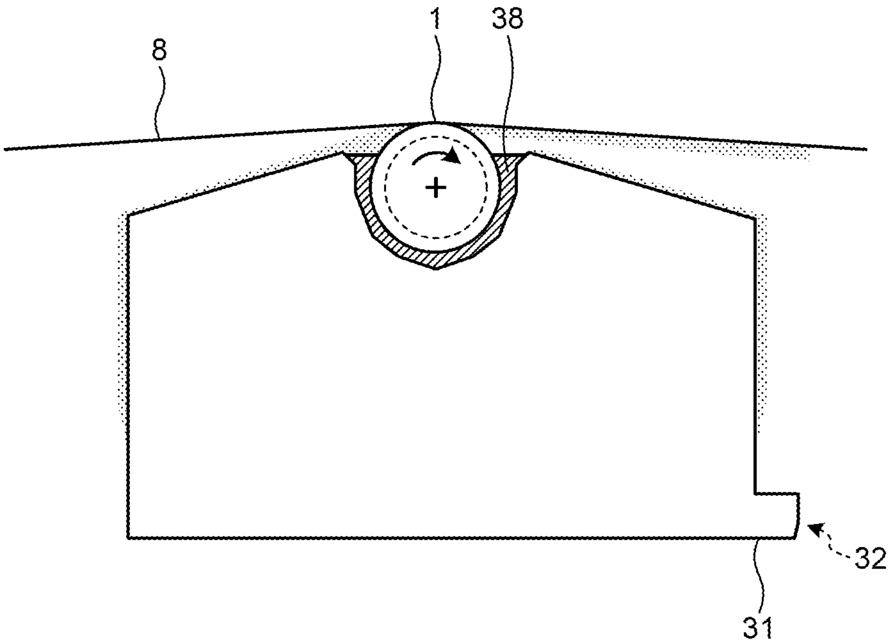
FIG. 4 is a side view of the coating apparatus in FIG. 2 viewed from a W direction.

The apparatus configuration of a first coating apparatus will be described. FIG. 1 is a schematic cross-sectional view of the first coating apparatus, FIG. 2 is a top view of the coating apparatus in FIG. 1 viewed from a Z direction, FIG. 3 is an enlarged view of an area in the vicinity of a coating bar in the coating apparatus of FIG. 1, and FIG. 4 is a side view of the coating apparatus in FIG. 2 viewed from a W direction. In these drawings, the longitudinal direction of a container 31 is determined to be a Y direction, the direction orthogonal to this Y direction is determined to be an X direction, and the direction orthogonal to the X direction and Y direction is determined to be a Z direction. The X direction corresponds to the conveying direction in which a web 8 is conveyed and the Z direction corresponds to the vertical direction of the coating apparatus.

FIG. 1 is referred. The first coating apparatus includes a container 31 for accumulating a coating liquid, a coating bar 1 immersed in a coating liquid 32, and rotatable supports 2 for supporting the coating bar 1 from below. Supports 2 are composed of upstream side supports 2*a* (hereinafter, may simply referred to as "supports 2*a*") having an axis center 13*a* on the upstream side in the conveying direction of the web 8 with respect to an axis center 12 of the coating bar 1 and supporting the coating bar from below on the upstream side and upstream side supports 2*b* (hereinafter, may simply referred to as "supports 2*b*") having an axis center 13*b* on the downstream side in the conveying direction of the web 8 with respect to the axis center 12 of the coating bar 1 and supporting the coating bar from below on the downstream side. At the upper part of the container 31, an upstream side cover 33 located on the upstream side of the web 8 in the conveying direction (illustrated by an arrow at the end of the web 8 in FIG. 1) with respect to the coating bar 1 and a downstream side cover 34 located on the downstream side exist. The upstream side cover 33 and the downstream side cover 34 form an opening part extending in the longitudinal direction of the container 31 (in this embodiment, in the Y direction of the coordinate axis illustrated in FIG. 2). The coating bar 1 is arranged in the opening part so that the direction of the rotation axis directs the longitudinal direction of the opening part. The coating bar 1 is arranged with a clearance 35 from the downstream side end of the upstream side cover 33 and arranged with a clearance 36 from the upstream side end of the downstream side cover 34.

FIG. 2 is referred. The coating bar 1 is freely and rotatably supported at both ends by bearings or other means (not illustrated). In addition, the coating bar 1 is supported in a circumscribed manner from below by respective plurality of rotatable supports 2*a* and 2*b* intermittently arranged along the longitudinal direction of the coating bar 1. The coating bar 1 is pressed to the web 8 conveyed from the upstream side to the downstream side at a predetermined speed to drivenly rotate and the supports 2*a* and 2*b* supporting the coating bar 1 also drivenly rotate by the coating bar 1.

FIGS. 1 and 4 are referred. The flow of the coating liquid in the first coating apparatus will be described. The coating liquid 32 is continuously supplied from a coating liquid inlet 30 by a coating liquid supply unit (not illustrated) to be filled in the container. A part of the coating liquid 32 is applied to the web 8 by being scraped up by the coating bar 1. The remaining coating liquid 32 continuously leaks out of the container through the clearance 35 between the surface of the coating bar 1 and the downstream side end of the upstream side cover 33, the clearance 36 between the surface of the coating bar 1 and the upstream side end of the downstream side cover 34, and a clearance 38 between the side surface of the container 31 and the coating bar 1 (illustrated in FIG. 4 by diagonal lines).

Gear pumps, diaphragm pumps, and mohno pumps having a quantitative property and a low pulsation property are preferable as the coating liquid supply unit. In addition, the coating liquid discharged from the pump may be supplied to the container through a filter or a defoaming unit. Moreover, the coating liquid may be supplied to the container from several positions of the container.

[Upstream Side Cover and Downstream Side Cover]

FIG. 1 is referred. The upstream side cover 33 is preferably at least partially sloped downward from a horizontal level by 10° or more and 90° or less as the upstream side cover 33 leaves from the opening part side in the upstream side direction. The downstream side cover 34 is preferably at least partially sloped downward from the horizontal level by at least 10° or more and 90° or less as the downstream side cover 34 leaves from the opening part side in the downstream side direction. This prevents the coating liquid leaked from the clearance 35 between the surface of the coating bar 1 and the downstream side end of the upstream side cover 33 and the clearance 36 between the surface of the coating bar 1 and the upstream side end of the downstream side cover 34 from accumulating on the upper surface of the upstream side cover 33 and the downstream side cover 34 and thus altering the coating liquid and prevents generation of uneven coating due to disturbing a liquid pool 39 in the upstream side of the coating bar.

FIG. 2 is referred. As the shape of the upstream side (left side in FIG. 2) end of the downstream side cover 34, protrusions and recesses are repeatedly formed along the Y direction. Specifically, when a range of a upstream side end 15 of the downstream side cover 34 overlapped with the downstream side support 2*b* when the downstream side cover 34 is observed from above in the vertical direction (Z direction) is determined to be an overlapped range 14, in the shape of the downstream side cover 34, a part at which a clearance from the surface of the coating bar 1 in a range of the upstream side end 15 of the downstream side cover 34 interposed between adjacent overlapped ranges 14 is wider than a clearance from the surface of the coating bar 1 at a position in the overlapped range 14 exists. Here, the term "clearance from the surface of the coating bar" refers to the shortest distance from each point on the upstream side end 15 of the downstream side cover 34 to the surface of the coating bar (here, corresponding to the distance in the X direction). In addition, the term "the range of the upstream side end of the downstream side cover overlapped with the downstream side support when the downstream side cover is observed from above in the vertical direction" refers to the range where the upstream side end of the downstream side cover 34 is overlapped with the supports 2*b* when the downstream side cover 34 is assumed as a transparent product and observed, although, actually, the support 2*b* located under the downstream side cover 34 is not visible, if the downstream side cover 34 is not a transparent product.

The clearance between the surface of the coating bar 1 and the upstream side end 15 of the downstream side cover 34 is narrower within the overlapped range of the support 2*b* and the downstream side cover 34 (overlapped range 14) and thus fluctuations in the liquid surface due to the accompanying flow of the supports 2*b* during high-speed coating can be prevented. As a result, adhering the coating liquid 32 to the web 8 and entering air bubbles in the coating area can be prevented and thus coating defects being caused by the air bubbles can be reduced. In addition, even in the case where the air bubbles are mixed in the coating liquid 32 filled in the coating apparatus, a part having a wider clearance within a range where the support 2*b* and the downstream side cover 34 are not overlapped exists, whereby the air bubbles can be discharged from this part. Consequently, the air bubbles being taken by the coating bar can be prevented and thus coating defects being caused by the air bubbles can be reduced.

The clearance in the range interposed between the adjacent overlapped ranges 14 may be wider within all of this range or may be wider in some parts of this range as long as the air bubbles can be discharged.

Any methods can be used as the method in which the clearance between the surface of the coating bar 1 and the upstream side end 15 of the downstream side cover 34 is narrowed or widened. Examples of the method include a method in which a cut is formed within the range where the upstream side end 15 is interposed between the adjacent overlapped ranges 14, a method in which the shape of the entire upstream side end 15 is corrugated, and a method in which a different member is attached to the overlapped range 14 of the upstream side end 15.

FIG. 3 is referred. With respect to the downstream side cover 34, a height L2 located on the lowest position in the upstream side end 15 of the downstream side cover 34 is arranged at a higher position in the vertical direction than a height L1 located on the highest position A in the vertical direction of the supports 2 (2*b*) along the longitudinal direction of the container 31. When the upstream side end 15 is located at a position higher in the vertical direction than the highest position L1 of the supports 2 in the vertical direction, the height of the downstream side liquid surface 41 is higher than the highest position L1 of the supports 2 in the vertical direction, resulting in being less likely to enter the air bubbles by the rotation of the supports 2. [Coating Bar]

As the coating bar 1, for example, a rod, a wire bar having grooves formed by winding wires around the outer circumferential surface of a rod, and a rolled rod having grooves formed by a rolling process on the outer circumferential surface of a rod can be used. The material of the coating bar 1 is preferably stainless steel and, in particular, SUS304 or SUS316 are preferable. The surface of the coating bar 1 may be subjected to a surface treatment such as hard chrome plating. For example, the diameter of the coating bar 1 is preferably 5 mm to 20 mm because a coating bar having a large diameter tends to cause stripe-like coating defects along the conveying direction referred to as ribbing, whereas a coating bar having a small diameter increases the deflection of the coating bar 1. In addition, in this embodiment, the coating bar 1 is pressed to the web 8 and rotated by frictional force with the web 8, which is in a state of what is called driven rotation. The coating bar 1, however, may also be rotated by a driving device such as a motor. In the case where the coating bar 1 is rotated by the driving device, the coating bar 1 is preferably rotated in the conveying direction of the web 8 at substantially almost the same speed as the conveying speed of the web 8 in order to prevent scratch being caused on the web 8. Here, the term "substantially almost the same speed" means that rotation is performed so that the speed difference between the peripheral speed of the coating bar 1 and the conveying speed of the web 8 is within ±10%. However, in the case where the scratches on the web do no matter depending on product applications or the like, the coating bar 1 may be rotated at a speed different from the conveying speed of the web 8. In addition, with respect to the winding angle α to the coating bar 1 illustrated in FIG. 1, the web 8 may flap or vibrate and thus traverse coating defects may be caused when the winding angle α is excessively small, whereas the load on the coating bar 1 and the supports 2 may increase and thus the deflection of the coating bar 1 may increase and the supports 2 may be abraded when the winding angle α is excessively large. Therefore, the winding angle α is preferably set to a range between 2 degrees to 30 degrees.

[Support]

The supports 2 may be any supports such as a roller and a ball that support the coating bar 1 while rotating. In order to reduce the abrasion of the coating bar 1, a material having lower hardness than that of the coating bar 1 is preferably used on the surface layer in the supports 2. As the material for the surface layer, a synthetic rubber or an elastomer is preferably used. Here, the elastomer refers to a rubber-like elastic resin that can be melt-molded by, for example, injection molding, extrusion molding, cast molding, blow molding, or inflation molding. As the elastomer, for example, a urethane elastomer, a polyester elastomer, and a polyamide elastomer are preferable. In particular, a thermoplastic polyurethane elastomer having excellent abrasion resistance and mechanical strength is preferably used. The thickness of the elastomer molded onto the surface layer of the supports 2 is preferably 0.5 mm to 6 mm. The hardness of the elastomer is preferably 60 A to 98 A (measured in accordance with the standard of JIS K6253, 1796).

In order to stably hold the coating bar 1, the supports 2 are preferably placed on both sides of the upstream side and the downstream side of the coating bar 1 to the conveying direction of the web 8 as this embodiment. In addition, in order to avoid interference of facing supports 2, the supports 2 may be arranged so as to be slightly shifted in the longitudinal direction of the coating bar 1. When an angle determined by a line connecting the axis center 13*a* of the support 2*a* arranged upstream side of the coating bar 1 to the conveying direction of the web 8 and the axis center 12 of the coating bar 1 with the vertical direction is determined to be β1 (illustrated in FIG. 1) and an angle determined by a line connecting the axis center 13*b* of support 2*b* arranged upstream side of the coating bar 1 to the conveying direction the web 8 and the axis center 12 of the coating bar 1 with the vertical direction is determined to be β2 (illustrated in FIG. 1), both of the angles β1 and β2 are preferably 10 degrees or more. Excessively small angles β1 and β2 may cause coating defects due to the vibration of the coating bar 1 caused by the vibration of the web 8.

Uneven rotation or vibration of the supports 2 is likely to cause coating defects by transmitting the rotation or vibration to the coating bar 1 and thus the supports 2 preferably have a structure including bearings for smooth rotation. The supports 2 are submerged in the coating liquid and thus, as the material of the bearing, a material having high corrosion resistance to the coating liquid is preferable and a material having a waterproof property is more preferable. The diameter of the supports 2 is preferably 8 mm or more because commercially available bearings can be used. The length in the axis direction of the supports 2 is preferably 3 mm to 25 mm because general-purpose bearings can be used in order to reduce the generated accompanying flow.

The arrangement clearance between the supports 2 arranged along the longitudinal direction of the coating bar 1 is preferably narrow because an excessively wide arrangement clearance causes deflection of the coating bar 1 to be large. As a target, the coating bar 1 is preferably arranged so that the deflection of the coating bar 1 is 10 μm or less. The amount of deflection may be determined from the formula of material mechanics using the secondary moment of the cross section and Young's modulus of the coating bar 1 when the tension applied to the web 8 in the running direction and the reaction force to the out-of-plane direction of the web 8 calculated from the winding angle α of the web 8 to the coating bar 1 are determined to be the equal distribution load on the coating bar 1 and the supports 2 are determined to be the support points.

Examples of the materials for the supports 2 include metals such as iron, stainless steel, aluminum, and copper; synthetic resins such as nylon, an acrylic resin, a vinyl chloride resin, and tetrafluoroethylene; and rubbers. The shape may be either a plate shape or a block shape.

[Coating Liquid]

The viscosity of the coating liquid is preferably 0.1 Pa s or less. In the case where the viscosity of the coating liquid is high, the coating liquid may become stripe-like form when the coating bar 1 rakes up the coating liquid in the container and the uniform coating cannot be performed in the width direction of the web. Consequently, stripe-like coating defects may be caused. In this embodiment, the viscosity of the coating liquid is measured in accordance with the standard of JIS Z8803, 1796. For example, a rheometer (RC20, manufactured by RHEOTECH) may be used as a measuring apparatus. Ideally, in measuring the viscosity, the temperature of the coating liquid, which is the measurement condition, is determined to be the temperature of the coating liquid at the actual coating part. However, it is difficult to accurately know the temperature of the coating liquid at the coating part. Therefore, the temperature of the coating liquid may be substituted by a coating liquid temperature in a coating liquid supply unit (not illustrated) such as a feeding tank. The peripheral rotation speed of the coating bar 1 is preferably 300 m/minute or less. A high peripheral rotation speed tends to cause stripe-like coating defects.

The amount of the coating liquid to be applied is preferably be 2 g/m$^2$ to 100 g/m$^2$ and more preferably 4 g/m$^2$ to 50 g/m$^2$ in a wet state immediately after the coating. The amount to be applied can be adjusted by the size of the grooves formed on the coating bar. The groove size can be changed by changing the wire diameter of the wire to be wound in the case where the coating bar is a wire bar or by performing a rolling process with dies having different groove depths and/or groove pitches in the case where the coating bar is a rolled rod.

[Second Coating Apparatus]

Figure 5:
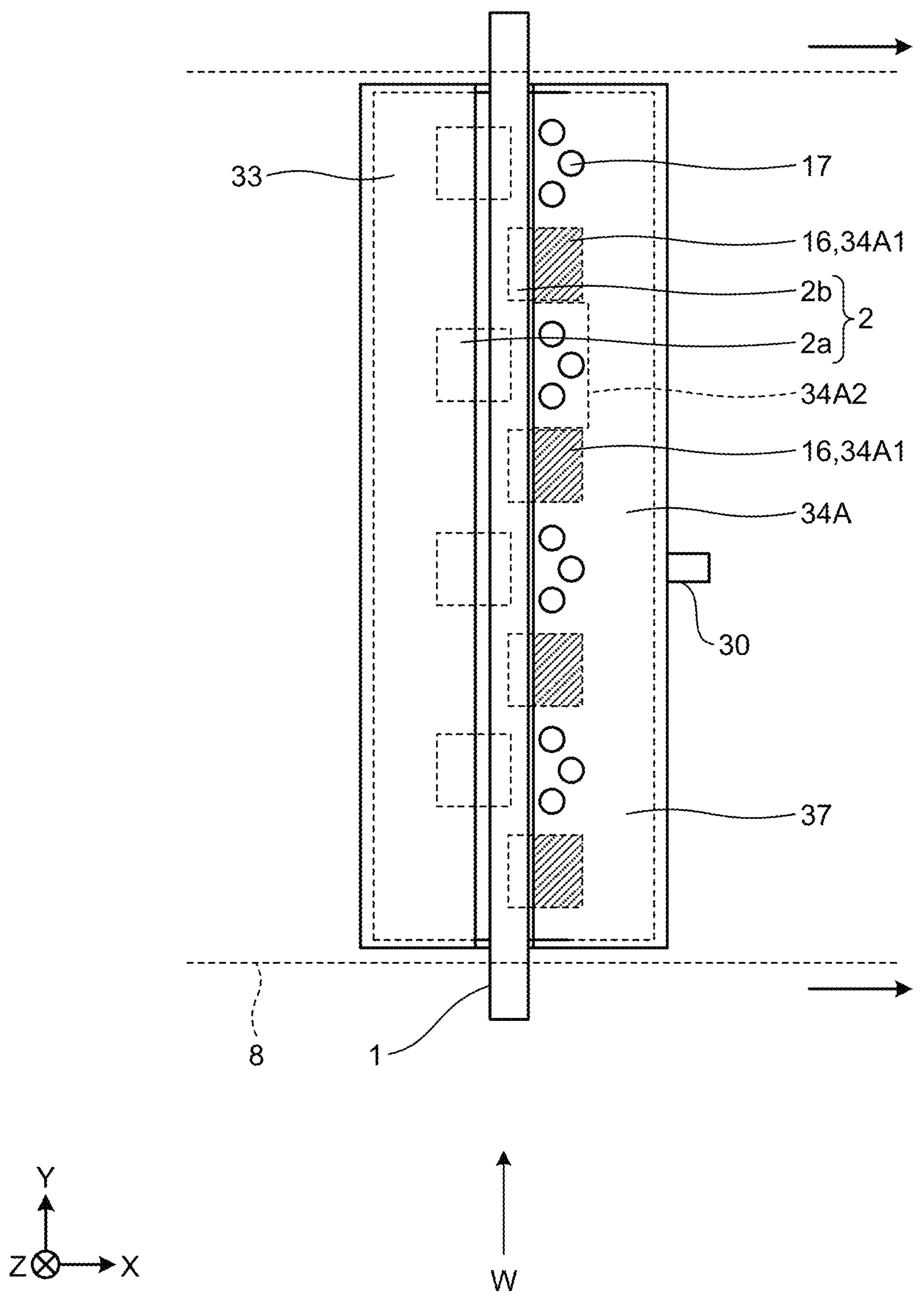
FIG. 5 is a schematic top view of a second coating apparatus according to embodiments of the present invention.
Figure 6:
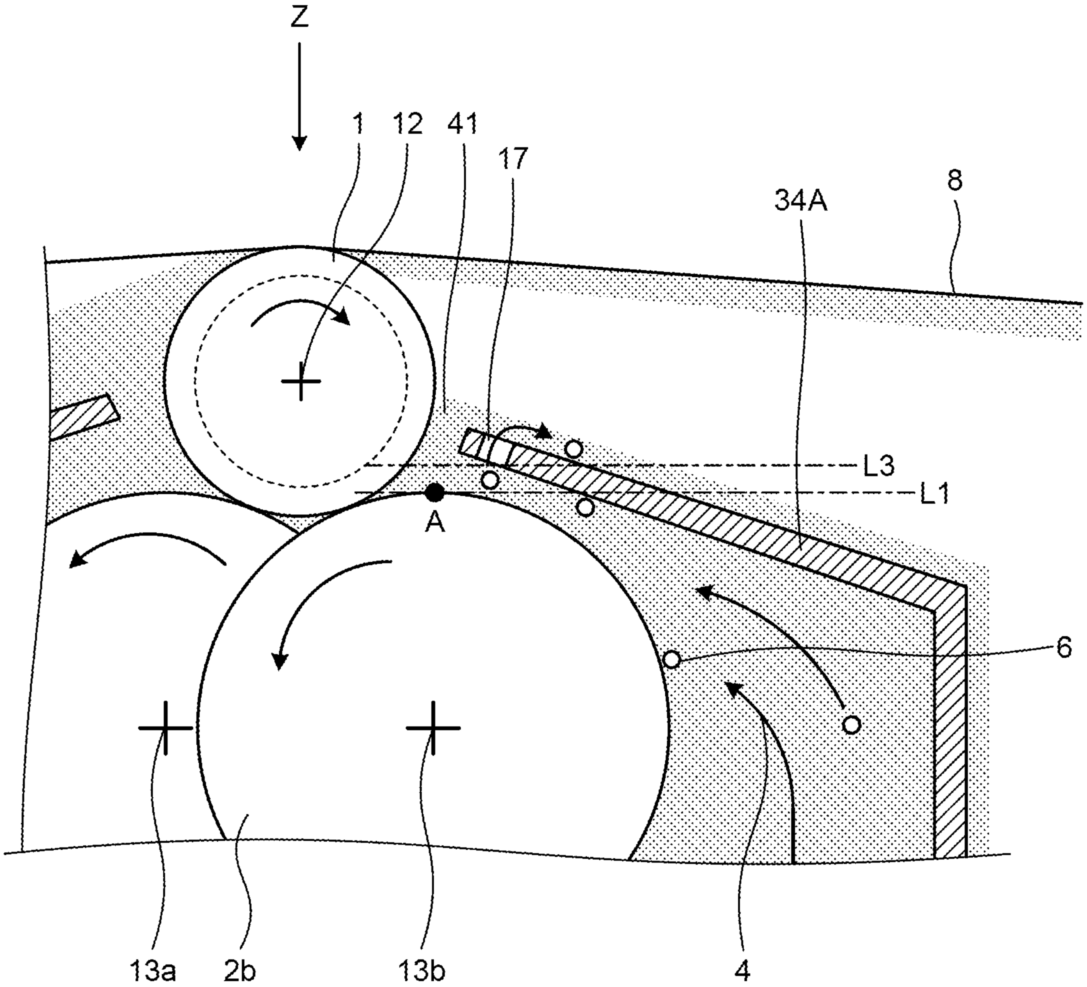
FIG. 6 is an enlarged view of an area in the vicinity of a coating bar of the coating apparatus in FIG. 5.

The apparatus configuration of a second coating apparatus will be described. FIG. 5 is a schematic top view of the second coating apparatus and FIG. 6 is an enlarged view of an area in the vicinity of a coating bar of the coating apparatus in FIG. 5. The second coating apparatus has a downstream side cover 34A in place of the downstream side cover 34 of the first coating apparatus. The second coating apparatus has the same apparatus configuration as the apparatus configuration of the first coating apparatus except the downstream side cover 34A and thus description other than the downstream side cover 34A will be omitted.

FIG. 5 is referred. When a region of the downstream side cover 34A overlapped with the downstream side support 2*b* when the downstream side cover 34A is observed from above in the vertical direction is determined to be an overlapped region 16, in the downstream side cover 34A, openings 17 are formed at a position adjacent to the overlapped region 16 in the Y direction. For example, in the downstream side cover 34A, the openings 17 are formed in the region interposed between the adjacent overlapped regions 16. In the first coating apparatus, the part having a wider clearance between the surface of the coating bar 1 and the upstream side end 15 of the downstream side cover 34 exists within the range where the support 2*b* and the downstream side cover 34 do not overlap. The openings 17 exhibit the same effect as this part having the wider clearance. In other words, even when the air bubbles are mixed in the coating liquid 32 filled in the coating apparatus, the air bubbles can be discharged through the openings 17 and thus the air bubbles being taken by the coating bar can be prevented and coating defects being caused by the air bubbles can be reduced.

As long as the air bubbles can be discharged, the shape of the openings 17 may be any shapes of a circular shape, a rectangular shape, an oval shape, or the like and the size and number of the openings are not particularly limited.

FIG. 6 is referred. With respect to the openings 17 formed in the downstream side cover 34A, a height L3 at the lowest position of respective edges in the vertical direction is preferably higher in the vertical direction than the height L1 at the highest position of the supports 2 in the vertical direction. When each edge of the openings 17 is located at a higher position in the vertical direction than the highest position L1 of the supports 2 in the vertical direction, the height of the downstream side liquid surface 41 is higher than the highest position L1 of the supports 2 in the vertical direction and thus the air bubbles are difficult to be trapped by the rotation of the supports 2.

[Third Coating Apparatus]

Figure 7:
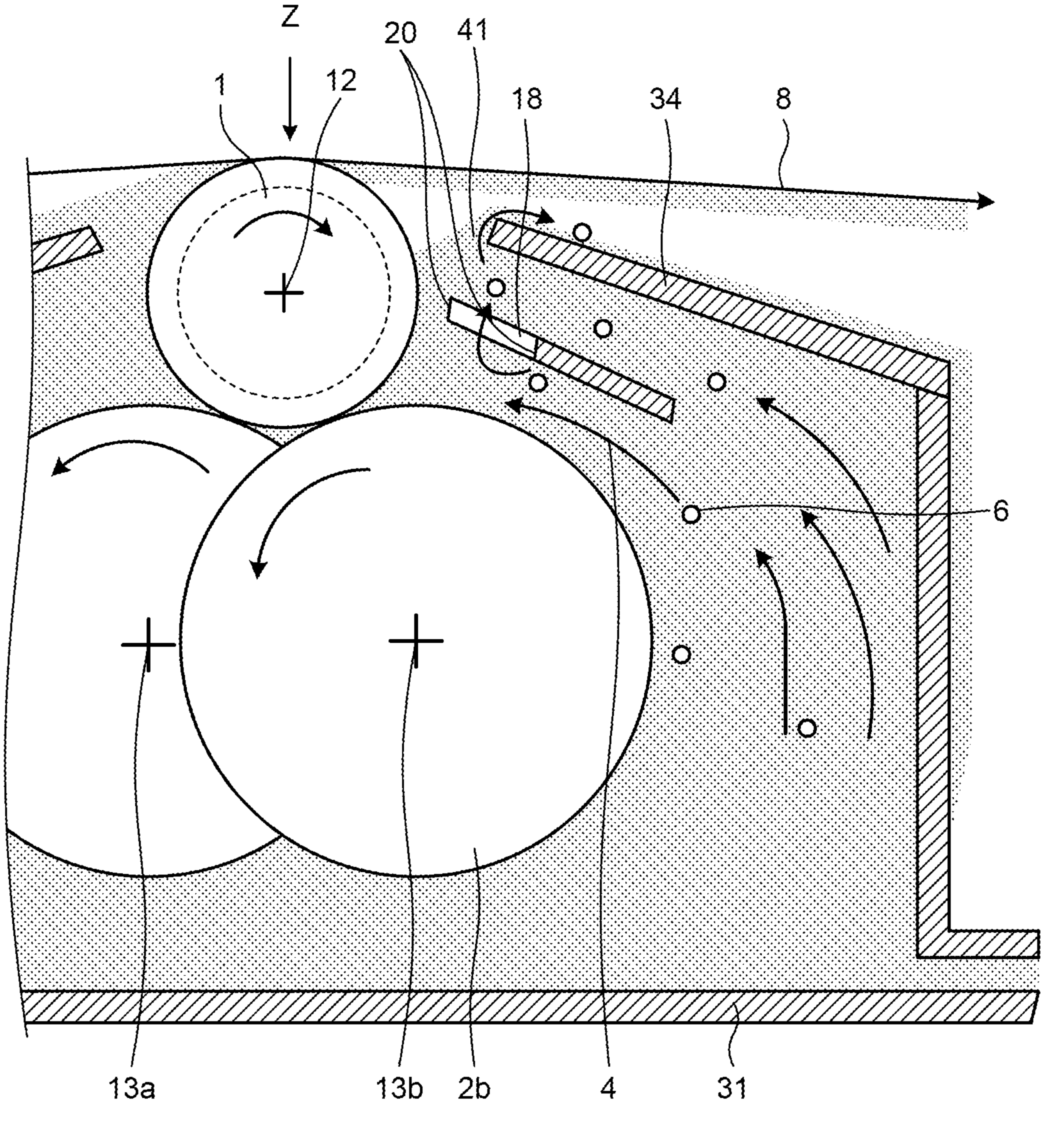
FIG. 7 is a schematic cross-sectional view of a third coating apparatus according to embodiments of the present invention.
Figure 8:
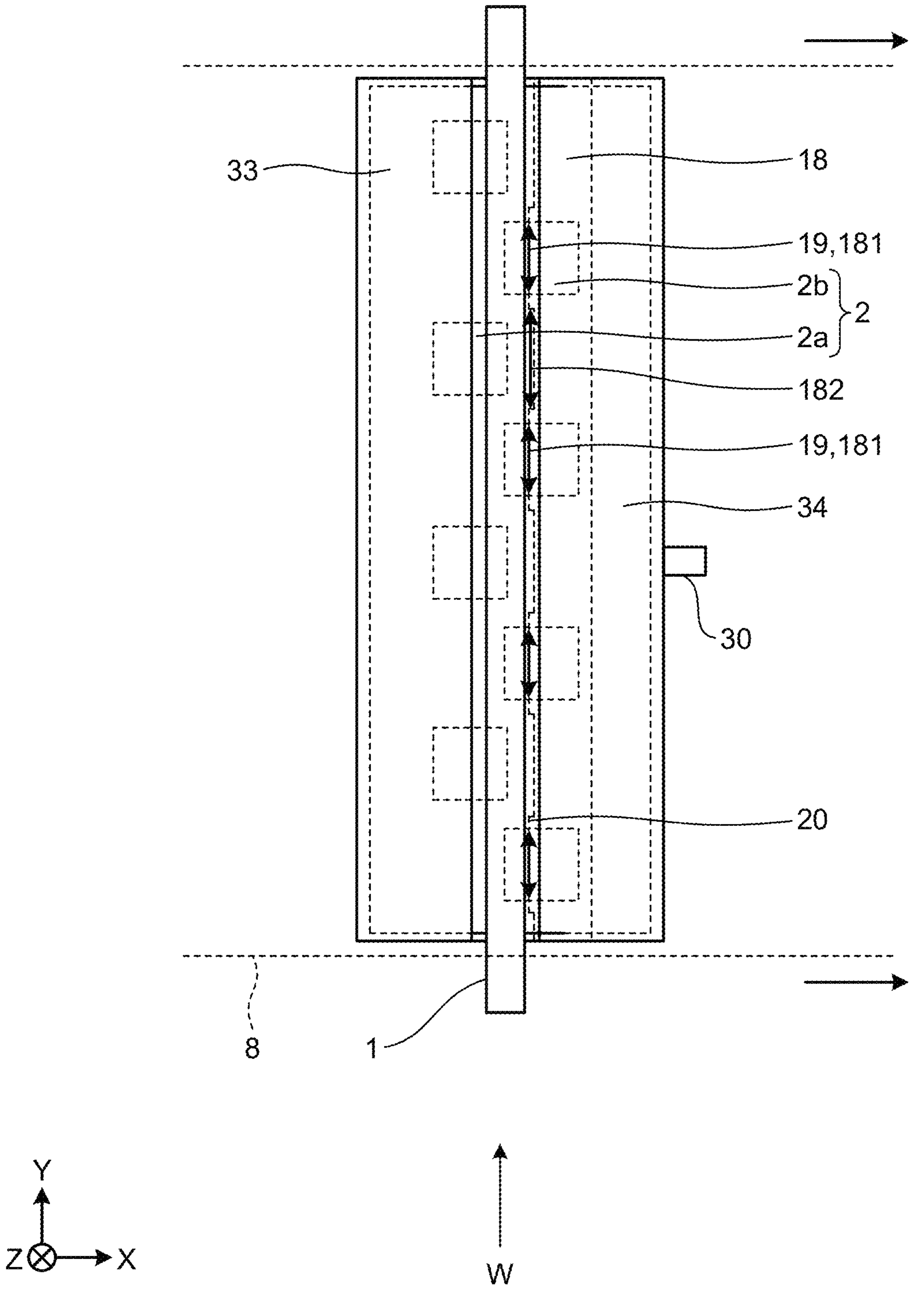
FIG. 8 is a top view of the coating apparatus in FIG. 7 viewed from the Z direction.

The apparatus configuration of a third coating apparatus will be described. FIG. 7 is an enlarged view of an area in the vicinity of a coating bar of the third coating apparatus and FIG. 8 is a top view of the coating apparatus of FIG. 7 from the Z direction. The third coating apparatus further includes an in-liquid cover 18 with respect to the first coating apparatus. The third coating apparatus has the same apparatus configuration as the apparatus configuration of the first coating apparatus except the in-liquid cover 18 and thus description other than the in-liquid cover 18 will be omitted. In the third coating apparatus, the downstream side cover 34 may have any shape.

FIG. 7 is referred. The third coating apparatus include an in-liquid cover 18 between the downstream side cover 34 and the downstream side support 2*b* in the container 31.

FIG. 8 is referred. The shape of the upstream side (left side of FIG. 8) end of the in-liquid cover 18 forms a shape in which protrusions and recesses are repeated along the Y direction. Specifically, when the range of the upstream side end of the in-liquid cover 18 overlapped with the downstream side support 2*b* when the in-liquid cover 18 is observed from above in the vertical direction is determined to be an overlapped range 19, in the shape of the in-liquid cover 18, a part at which a clearance from the surface of the coating bar 1 in a range of an upstream side end 20 of the in-liquid cover 18 interposed between the adjacent overlapped ranges 19 is wider than a clearance from the surface of the coating bar 1 at a position in the overlapped range 19 exists. Here, the term "clearance from the surface of the coating bar" refers to the shortest distance from each point on the upstream side end 20 of the in-liquid cover 18 to the surface of the coating bar. The term "the range of the upstream side end of the in-liquid cover overlapped with the downstream side support when the in-liquid cover 18 is observed from above in the vertical direction" refers to the range where the in-liquid cover 18 is overlapped with the support 2*b* when both of the downstream side cover 34 and the in-liquid cover 18 are assumed as transparent products and observed, although, actually, the support 2*b* located under the downstream side cover 34 are not visible, if both of the downstream side cover 34 and the in-liquid cover 18 are not transparent products.

The clearance between the surface of the coating bar 1 and the upstream side end 20 of the in-liquid cover 18 is narrower within the overlapped range of the support 2*b* and the in-liquid cover 18 (overlapped range 19) and thus fluctuations in the liquid surface 41 due to the accompanying flow 4 of the support 2*b* during high-speed coating can be prevented. As a result, attaching the coating liquid 32 to the web and entering the air bubbles 6 in the coating area can be prevented and thus coating defects being caused by the air bubbles can be reduced. In addition, even in the case where the air bubbles 6 are mixed in the coating liquid 32 filled in the coating apparatus, a part having a wider clearance within a range where the support 2*b* and the in-liquid cover 18 are not overlapped exists, whereby the air bubbles can be discharged from this part. Consequently, the air bubbles being taken by the coating bar can be prevented and thus coating defects being caused by the air bubbles can be reduced.

The clearance in the range interposed between the adjacent overlapped ranges 19 may be wider in all of this range or may be wider in some parts of this range as long as the air bubbles can be discharged.

Any methods can be used as the method in which the clearance between the surface of the coating bar 1 and the upstream side end 20 of the in-liquid cover 18 is narrowed or widened. Examples of the method include a method in which a cut is formed within the range where the upstream side end 20 is interposed between the adjacent overlapped ranges 19, a method in which the shape of the entire upstream side end 20 is corrugated, and a method in which a different member is attached to the overlapped range 19 of the upstream side end 20.

[Fourth Coating Apparatus]

Figure 9:
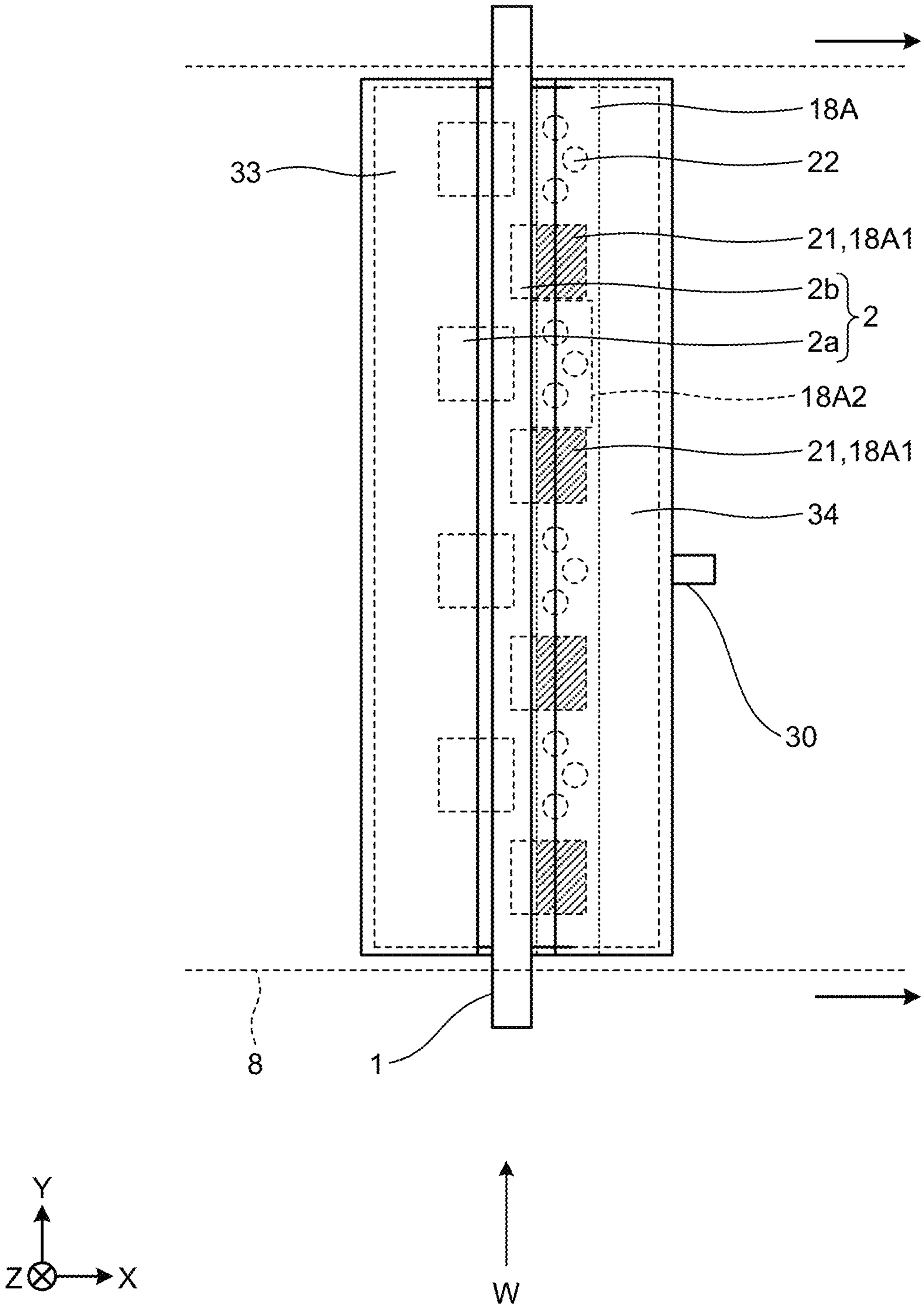
FIG. 9 is a schematic top view of a fourth coating apparatus according to embodiments of the present invention.

The apparatus configuration of a fourth coating apparatus will be described. FIG. 9 is a schematic top view of the fourth coating apparatus. The fourth coating apparatus has an in-liquid cover 18A in place of the in-liquid cover 18 of the third coating apparatus. The fourth coating apparatus has the same apparatus configuration as the apparatus configuration of the third coating apparatus except the in-liquid cover 18A and thus description other than the in-liquid cover 18A will be omitted.

FIG. 9 is referred. When a region of the in-liquid cover 18A overlapped with the downstream side support 2*b* when the in-liquid cover 18A is observed from above in the vertical direction is determined to be a overlapped region 21, openings 22 are formed in the in-liquid cover 18A within the region interposed between the adjacent overlapped regions 21. In the third coating apparatus, a part having a wider clearance between the surface of the coating bar 1 and the upstream side end 20 of the in-liquid cover 18 exists in a range where the support 2*b* and the in-liquid cover 18 are not overlapped. The openings 22 exhibit the same effect as this part having the wider clearance. In other words, even when the air bubbles are mixed in the coating liquid 32 filled in the coating apparatus, the air bubbles can be discharged through the openings 22 and thus the air bubbles being taken by the coating bar can be prevented and the coating defects being caused by the air bubbles can be reduced.

As long as the air bubbles can be discharged, the shape of the openings 22 may be any shapes of a circular shape, a rectangular shape, an oval shape, or the like and the size and number of the openings are not particularly limited.

EXAMPLE

Subsequently, the above embodiments will be specifically described with reference to Examples. The above embodiments, however, are not necessarily limited to the following Examples.

Example 1

The chips of polyethylene terephthalate (hereinafter abbreviated as PET) having a limiting viscosity (also referred to as an intrinsic viscosity) of 0.62 dl/g (measured at 25° C. in o-chlorophenol in accordance with the standard of JIS K7367, 1796) were sufficiently vacuum-dried at 160° C. The vacuum-dried chips were fed to an extruder and melted at 285° C. The melted polymer was extruded from a T-shape Die into a sheet-shaped product and wound onto a mirror-finished cast drum having a surface temperature of 23° C. using an electrostatic casting method. The sheet-shaped product was cooled and solidified to form an unstretched film. Subsequently, the unstretched film was heated by a group of rolls heated to 80° C. and stretched 3.2 times using a longitudinal stretching machine in the longitudinal direction while being further heated by an infrared heater. The stretched film was cooled with cooling rolls of which temperature was controlled at 50° C. to prepare a uniaxial stretched resin film. The width of the resin film was 1,700 mm. Subsequently, the lower surface of this resin film running at a speed of 200 m/min was coated with the coating liquid 32 using the first coating apparatus illustrated in FIGS. 1 and 2 as the coating apparatus. Subsequently, in a transverse stretching machine, the resin film coated with the coating liquid 32 was introduced into an oven at 90° C. to heat. Subsequently, the coating liquid 32 was dried in an oven at 100° C. and the resin film was stretched 3.7 times in a width direction. Further, heat setting of the resin film was performed while the resin film was being subjected to relaxation treatment at 5% in the width direction in an oven at 220° C. As described above, a biaxially oriented film having a film made of the coating liquid 32 on one side was obtained. The tension between the longitudinal stretching machine and the transverse stretching machine was controlled by a dancer roll so that the tension per unit width applied in the running direction of the plastic film was 8000 N/m.

As the coating liquid 32, a mixed liquid in which 5 parts by mass of a melamine-based cross-linking agent (a solution of imino group-type methylated melamine diluted in a mixed solvent of 10% by mass of isopropyl alcohol and 90% by mass of water) and 1 part by mass of colloidal silica particles having an average particle diameter of 0.1 μm were added to 100 parts by mass of the emulsion of a polyester copolymer (contained components: 90% by mole of terephthalic acid, 10% by mole of sodium 5-sulfoisophthalic acid, 96% by mole of ethylene glycol, 3% by mole of neopentyl glycol, and 1% by mole of diethylene glycol) was prepared. The viscosity of this coating liquid 32 was 2 mPa·s at 25° C.

This coating liquid was supplied to the container 31 at 17 kg/minute by a diaphragm pump (manufactured by Takumina Corporation). A coating liquid inlet was arranged at one position and the port was installed in the container 31 as illustrated in FIGS. 1 and 2. As the coating bar 1, a coating bar formed by winding a wire having a wire diameter of 0.1 mm around a stainless steel round bar material having a diameter of 12.7 mm and a length of 1650 mm (manufactured by Kano Trading Co.) was used. The respective supports 2*a* and 2*b* were rollers having a diameter of 22 mm and a length in an axial direction of 14 mm and a thermoplastic polyurethane elastomer having a hardness of 95 A was applied to the surface in a thickness of 2 mm. Four supports 2*a* and four supports 2*b* were arranged at an interval of 470 mm in the longitudinal direction of the coating bar 1. In this process, the supports 2*a* were arranged on the upstream side of the coating bar and the supports 2*b* were arranged on the downstream side in a staggered arrangement to the resin film conveying direction.

As the downstream side cover 34, the range of the upstream side end 15 of the downstream side cover 34 overlapped with the supports 2*b* when the downstream side cover 34 is observed from above in the vertical direction was determined to be the overlapped range 14 and the clearance between the upstream side end 15 of the downstream side cover 34 and the surface of the coating bar 1 was set to 0.5 mm in the overlapped range and was set to 1.0 mm in a range interposed between the adjacent overlapped ranges.

As the evaluation method, a transparent polycarbonate downstream side cover was used and the liquid surface 41 on the downstream side in the conveying direction of the resin film was observed during application. Whether the air bubbles were retained and accumulated was visually checked and the pulsation height of the liquid surface was measured.

As a result of the coating, the pulsation height of the liquid surface 41 on the downstream side in the conveying direction of the resin film was 5 mm and no attachment to the film was observed. In addition, an aspect that the air bubbles were discharged from the clearance from the surface of the coating bar 1 in the range interposed between the adjacent overlapped ranges 14 and were not accumulated inside the container was capable of being observed.

Example 2

Coating was performed in the same manner as the manner in Example 1 except that the second coating apparatus having a downstream side cover illustrated in FIG. 5 was used. As the downstream side cover 34, a cover in which a region of the downstream side cover overlapped with the support 2 when the downstream side cover 34 is observed from above in the vertical direction was determined to be the overlapped region 16 and four openings 17 having a diameter of 2 mm were arranged at an interval of 100 mm within the range interposed between the adjacent overlapped regions 16 and at a position 5 mm away from the upstream side end of the downstream side cover was used.

As a result of the coating, the pulsation height of the liquid surface 41 on the downstream side in the conveying direction of the resin film was 5 mm and no attachment to the film was observed. In addition, an aspect that the air bubbles were discharged from the openings 17 and were not accumulated inside the container was capable of being observed.

Example 3

The coating was performed in the same manner as the manner in Example 1 except that the third coating apparatus including the in-liquid cover 18 illustrated in FIGS. 7 and 8 and the downstream side cover that was uniform in entire width and had a plate-like shape was used. As the in-liquid cover 18, a cover in which a range of the upstream side end of the in-liquid cover 18 cover overlapped with the support 2 was determined to be the overlapped range 19 and the clearance from the surface of the coating bar 1 was set to 0.5 mm within the overlapped range and was set to 1.0 mm within a range interposed between the adjacent overlapped ranges. The clearance between the surface of the coating bar 1 and the upstream side end of the downstream side cover was set to 3.0 mm. The in-liquid cover 18 was made by using a stainless steel plate having a thickness of 1 mm and installed so that the stainless steel plate extended over the entire longitudinal width of the container.

As a result of the coating, the pulsation height of the liquid surface 41 on the downstream side in the conveying direction of the resin film was 0.5 mm and no attachment to the film was observed. In addition, an aspect that the air bubbles were discharged from the clearance from the coating bar and were not accumulated inside the container was capable of being observed.

Example 4

The coating was performed in the same manner as the manner in Example 1 except that the fourth coating apparatus including the in-liquid cover 18 illustrated in FIG. 9 and the downstream side cover that was uniform in entire width and had a plate-like shape was used. As the in-liquid cover 18, a cover in which a region of the in-liquid cover overlapped with the support 2 when the in-liquid cover 18 was observed from above in the vertical direction was determined to be the overlapped region 21 and four holes having a diameter of 2 mm were arranged at an interval of 100 mm within the range between the adjacent overlapped regions 21 and at a position 5 mm away from the upstream side end of the in-liquid cover 18 was used. The clearance between the surface of the coating bar 1 and the upstream side end of the downstream side cover was set to 3.0 mm. The in-liquid cover 18 was made by using a stainless steel plate having a thickness of 1 mm and installed so that the stainless steel plate extended over the entire longitudinal width of the container.

As a result of the coating, the pulsation height of the liquid surface 41 on the downstream side in the conveying direction of the resin film was 0.5 mm and no attachment to the film was observed. In addition, an aspect that the air bubbles were discharged from the openings 22 and were not accumulated inside the container was capable of being observed.

Comparative Example 1

Figure 10:
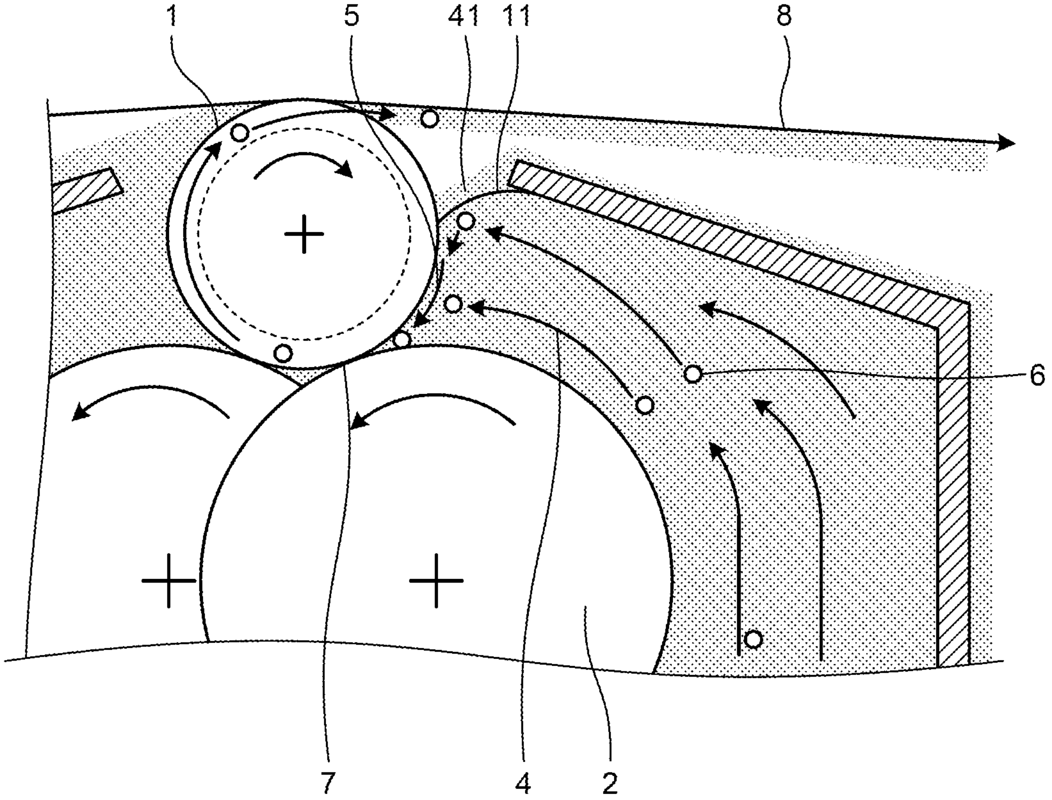
FIG. 10 is an enlarged view of an area in the vicinity of a coating bar in a coating apparatus of Patent Literature 3.
Figure 11:
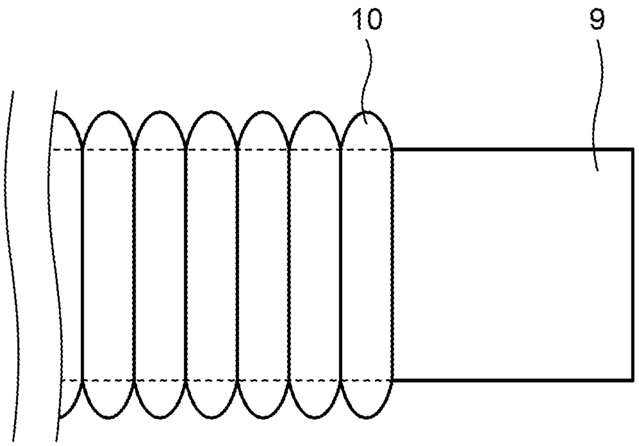
FIG. 11 is a schematic view illustrating a common coating bar surface.

The coating was performed at 200 m/minute in the same manner as the manner in Example 1 except that an elastic blade disclosed in Patent Literature 3 was installed as illustrated in FIG. 10 and the downstream side cover 34 was replaced with the downstream side cover that was uniform in entire width and had a plate-like shape. With respect to the elastic blade 11, a polyethylene film having a thickness of 0.1 mm was used. The elastic blade 11 was installed so as to fix one end to the lower surface of the downstream side upper end and to protrude from the tip of the downstream side upper end to the coating bar 1 side. The length of the protruding part (the length in the direction perpendicular to the longitudinal method of the coating bar) was set to 3 mm. The end of the elastic blade on the coating bar side is pressed to the coating bar 1 so as to contact the upper surface side of the elastic blade to the coating bar 1, as illustrated in FIG. 10. The length of the elastic blade in the film width direction was set to the same as the inner dimension of the container in the film width direction and the elastic blade was installed so as to extend over the entire width of the container.

As a result of the coating, the pulsation height of the liquid surface 41 on the downstream side of the resin film in the conveying direction could not be measured because the clearance between the surface of the coating bar 1 and the downstream side cover was blocked. Naturally, there was no attachment to the film. However, an aspect that air bubbles were accumulated and bubbling occurred in the downstream side cover was observed.

Comparative Example 2

Figure 12:
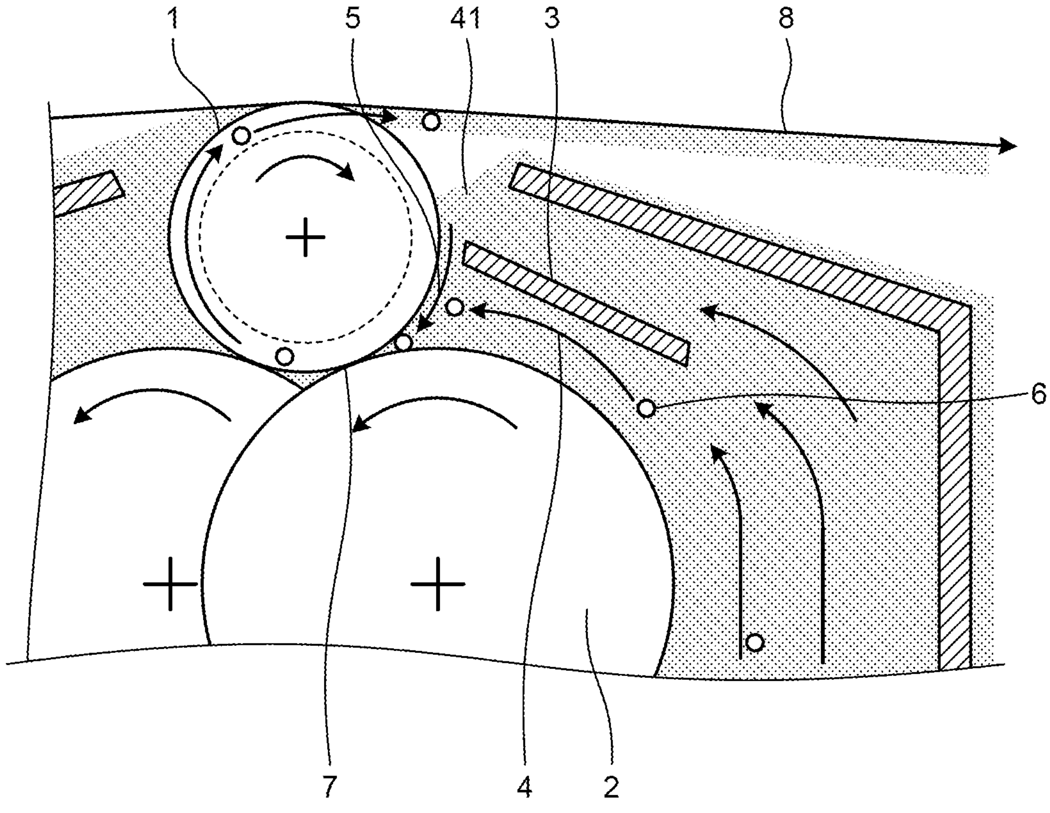
FIG. 12 is an enlarged view of an area in the vicinity of a coating bar in a coating apparatus of Patent Literature 4.

The coating was performed at 200 m/minute in the same manner as the manner in Example 1 except that the weir disclosed in Patent Literature 4 was installed as illustrated in FIG. 12 and the downstream side cover 34 was replaced with the downstream side cover that was uniform in entire width and had a plate-like shape. The clearance between the coating bar 1 and the tip of the weir 3 was set to 0.5 mm, the inclination angle of the weir 3 to the horizontal line was set to 15 degrees, and the minimum distance between the outer circumferential surface of the supports 2 and the weir 3 surface was set to 3 mm. The weir 3 was made by using a stainless steel plate having a thickness of 1 mm and installed so that the stainless steel plate extended over the entire longitudinal width of the container.

As a result of the coating, the pulsation height of the liquid surface 41 on the downstream side of the resin film in the conveying direction was 0.5 mm and no attachment to the film existed. However, an aspect that air bubbles were accumulated and bubbling occurred in the downstream side cover was observed.

Comparative Example 3

Figure 13:
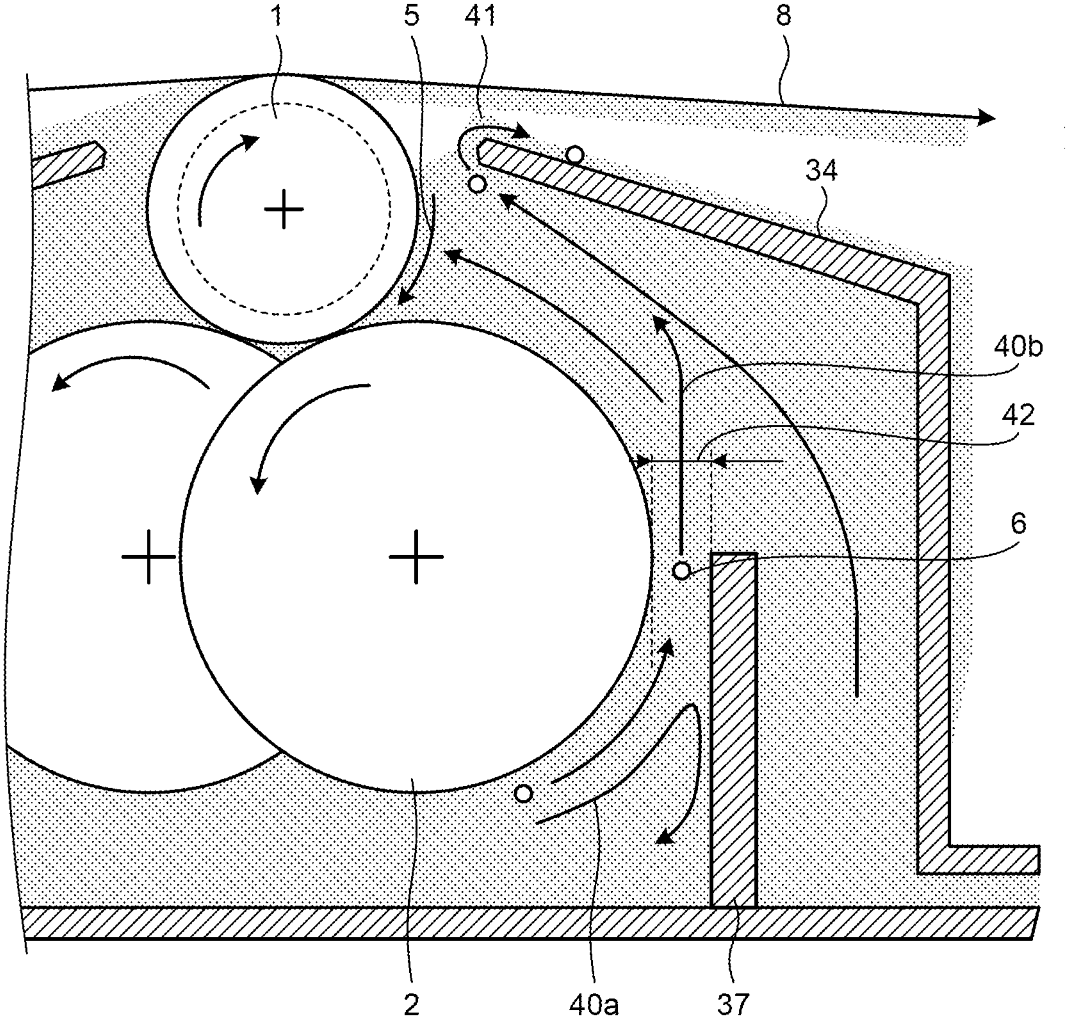
FIG. 13 is an enlarged view of an area in the vicinity of a coating bar in a coating apparatus of Patent Literature 5.

The coating was performed at 200 m/minute in the same manner as the manner in Example 1 except that the weir disclosed in Patent Literature 5 was installed as illustrated in FIG. 13 and the downstream side cover 34 was replaced with the downstream side cover that was uniform in entire width and had a plate-like shape. As the weir 37, a plate made of SUS304 was used. The weir 37 was installed on the downstream side of the supports 2*b* in the film conveying direction as illustrated in FIG. 1 so as to form a clearance 42 of 3 mm. The weir 37 was installed so that the height of the weir 37 was the same as the axial center 13*b* of the support 2*b*, as illustrated in FIG. 13 and installed so as to extend over the entire width of the container in the film width direction.

As a result of the coating, the pulsation height of the liquid surface 41 on the downstream side of the resin film in the conveying direction was 6 mm and the air bubbles were attached to the resin film to cause coating defects.

Comparative Example 4

The coating was performed at 200 m/minute in the same manner as the manner in Example 1 except that the downstream side cover 34 was replaced with the downstream side cover that was uniform in entire width and had a plate-like shape. The clearance between the surface of the coating bar 1 and the upstream side end of the downstream side cover was set to 1.0 mm.

As a result of the coating, the pulsation height of the liquid surface 41 on the downstream side of the resin film in the conveying direction was 9 mm and the air bubbles were attached to the resin film to cause coating defects.

The coating apparatus and coating method according to the present invention are useful for preventing the air bubbles from trapping and being taken even in high-speed coating and for reducing coating defects being caused by the air bubbles.

REFERENCE SIGNS LIST

1 Coating Bar
2 Supports
2*a* Upstream Side Supports
2*b* Downstream Side Supports
3 Weir
4 Accompanying Flow
5 Accompanying Flow of Coating Bar
6 Air Bubbles
7 Contact Point between Coating Bar and Support
8 Web
9 Rod
10 Wire
11 Elastic Blade
12 Axis Center of Coating Bar
13 Axis Center of Support
13*a* Axis Center of Upstream Side Support
13*b* Axis Center of Downstream Side Support
14 Overlapped Range
15 Upstream Side End of Downstream Side Cover
16 Overlapped Region
17 Openings
18, 18A In-liquid Cover
181 First Range of Upstream Side End of In-liquid Cover
182 Second Range of Upstream Side End of In-liquid Cover
18A1 First Region of In-liquid Cover
18A2 Second Region of In-liquid Cover
19 Overlapped Range
20 Upstream Side End of In-liquid Cover
21 Overlapped Region
22 Openings
30 Coating Liquid Inlet
31 Container
32 Coating Liquid
33 Upstream Side Cover
34, 34A Downstream Side Cover
341 First Range of Upstream Side End of Downstream Side Cover
342 Second Range of Upstream Side End of Downstream Side Cover
34A1 First Region of Downstream Side Cover
34A2 Second Region of Downstream Side Cover
35 Clearance between Downstream Side End of Upstream Side Cover and Coating Bar Surface
36 Clearance between Upstream Side End of Downstream Side Cover and Coating Bar Surface
37 Weir
38 Clearance between Side Surface of Container and Coating Bar
39 Liquid Pool
40*a* Accompanying Flow from Lower Part of Supports
40*b* Accompanying Flow from Upper Part of Supports
41 Liquid Surface
42 Clearance between weir and support
L1 Height of Highest Position of Support in Vertical Direction
L2 Height of Upstream Side End of Downstream Side Cover
L3 Height of Opening Edge of Downstream Side Cover
α Winding Angle
β1 Installation Angle of Support
β2 Installation Angle of Support

The invention claimed is:

1. A coating apparatus comprising:

a container configured to accumulate a coating liquid, the container including an upstream side cover and a downstream side cover dividedly arranged in an upper part of the container on an upstream side and a downstream side in a running direction of a web to form an opening part extending in a longitudinal direction of the container;

a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container;

a plurality of rotatable supports intermittently arranged along the rotation axis direction of the coating bar, the supports supporting the coating bar from below in the container; and an in-liquid cover extending in the longitudinal direction of the container, the in-liquid cover being arranged between the downstream side cover and the supports, wherein in a top view of the coating apparatus, a first range of an upstream side end of the in-liquid cover is overlapped with the supports and is defined as an overlapped range, and a second range of the upstream side end of the in-liquid cover is at least a portion of a range between adjacent overlapped ranges, and wherein a clearance between the upstream side end of the in-liquid cover and a surface of the coating bar is wider in the second range than in each of the adjacent overlapped ranges.

2. A coating apparatus comprising:

a container configured to accumulate a coating liquid, the container including an upstream side cover and a downstream side cover dividedly arranged on an upper part of the container in an upstream side and a downstream side in a running direction of a web to form an opening part extending in a longitudinal direction of the container;

a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container;

a plurality of rotatable supports intermittently arranged along the rotation axis direction of the coating bar, the supports supporting the coating bar from below in the container;

an in-liquid cover extending in the longitudinal direction of the container, the in-liquid cover being arranged between the downstream side cover and the supports, wherein top view of the coating apparatus, a first region of the in-liquid cover is overlapped with the supports and is defined as an overlapped region, and a second region of the in-liquid cover is between adjacent overlapped regions, and wherein openings are formed in the second region of the in-liquid cover.

3. A coating apparatus comprising:

a container configured to accumulate a coating liquid, the container including an upstream side cover and a downstream side cover dividedly arranged on an upper part of the container in an upstream side and a downstream side in a running direction of a web to form an opening part extending in a longitudinal direction of the container;

a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; and a plurality of rotatable supports intermittently arranged along the rotation axis direction of the coating bar, the supports supporting the coating bar from below in the container, wherein in a top view of the coating apparatus, a first range of an upstream side end of the downstream side cover is overlapped with the supports and is defined as an overlapped range, and a second range of the upstream side end of the downstream side cover is at least a portion of a range between adjacent overlapped ranges, and wherein a clearance between the upstream side end of the downstream side cover and a surface of the coating bar is wider in the second range than in each of the adjacent overlapped ranges.

4. The coating apparatus according to claim 3, wherein the upstream side end of the downstream side cover is located at a higher position in the vertical direction than a highest position of the supports in the vertical direction over the longitudinal direction of the container.

5. A coating apparatus comprising:

a container configured to accumulate a coating liquid, the container including an upstream side cover and a downstream side cover dividedly arranged on an upper part of the container in an upstream side and a downstream side in a running direction of a web to form an opening part extending in a longitudinal direction of the container;

a rotatable coating bar arranged at the opening part so that the coating bar has a clearance between the coating bar and a downstream side end of the upstream side cover and a clearance between the coating bar and an upstream side end of the downstream side cover and a rotation axis direction of the coating bar is directed in a longitudinal direction of the container; and a plurality of rotatable supports intermittently arranged along the rotation axis direction of the coating bar, the supports supporting the coating bar from below in the container, wherein in a top view of the coating apparatus, a first region of the downstream side cover is overlapped with the supports and is defined as an overlapped region, and a second region of the downstream side cover is between adjacent overlapped regions, and wherein openings are formed in the second region of the downstream side cover.

6. The coating apparatus according to claim 5, wherein a lowest position of each edge in the vertical direction in the openings formed in the downstream side cover is higher in the vertical direction than the highest position of the supports in the vertical direction.

7. A coating method comprising:

using the coating apparatus according to claim 1;

immersing the coating bar into a coating liquid while supplying the coating liquid into the container;

pressing the coating bar to a web conveyed from an upstream side to a downstream side at a predetermined speed; and coating the web with the coating liquid.

8. A coating method comprising:

using the coating apparatus according to claim 2;

immersing the coating bar into a coating liquid while supplying the coating liquid into the container;

pressing the coating bar to a web conveyed from an upstream side to a downstream side at a predetermined speed; and coating the web with the coating liquid.

9. A coating method comprising:

using the coating apparatus according to claim 3;

immersing the coating bar into a coating liquid while supplying the coating liquid into the container;

pressing the coating bar to a web conveyed from an upstream side to a downstream side at a predetermined speed; and coating the web with the coating liquid.

10. A coating method comprising:

using the coating apparatus according to claim 5;

immersing the coating bar into a coating liquid while supplying the coating liquid into the container;

pressing the coating bar to a web conveyed from an upstream side to a downstream side at a predetermined speed; and coating the web with the coating liquid.

11. The coating apparatus according to claim 1, wherein the second range is an entirety of the range between the adjacent overlapped ranges.

12. The coating apparatus according to claim 3, wherein the second range is an entirety of the range between adjacent overlapped ranges.

* * * * *